United States Patent [19]

Staiger

[11] 3,807,019

[45] Apr. 30, 1974

[54] AUTOMATIC WIRING SYSTEM

[75] Inventor: Bruno Staiger, Erligheim, Germany

[73] Assignee: International Standard Electric Corporation, New York, N.Y.

[22] Filed: Sept. 13, 1972

[21] Appl. No.: 288,622

[30] Foreign Application Priority Data

Oct. 2, 1971 Germany............................ 2149364

[52] U.S. Cl. .......................... 29/203 B, 29/203 MW

[51] Int. Cl. ....................... H01r 43/04, H05k 13/04

[58] Field of Search ...... 29/203 B, 203 P, 407, 626, 29/203 MW

[56] References Cited

UNITED STATES PATENTS

| | | | |
|---|---|---|---|
| 2,959,848 | 11/1960 | Savitt | 29/203 B |
| 3,548,493 | 12/1970 | Hubbard | 29/407 X |
| 3,667,104 | 6/1972 | Chamillard | 29/203 P X |

*Primary Examiner*—Thomas H. Eager
*Attorney, Agent, or Firm*—John T. O'Halloran; Menotti J. Lombardi

[57] ABSTRACT

In an automatic wiring system for wiring a field of contact pins an automatically controlled wiring tool located in front of the pins is rigidly connected to one of a pair of test adapters located to the rear of the pins. Testing of the pins before and after wiring is thereby automatically provided.

4 Claims, 7 Drawing Figures

AUTOMATIC WIRING SYSTEM

BACKGROUND OF THE INVENTION

The present invention relates to an automatic wiring system for the wiring of a field of contact pins providing for a rearward access to the contact pins, and employing a numerical movement control for a wiring tool as well as for a pair of test adapters on the rear side of the field of contact pins.

A device is already known for establishing electrical control and/or power supply connections between the terminal pins of supporting plates. In such a device it is provided that the holding arrangement for the tool establishing the wire connection is capable of being positioned with the aid of a numerical track or movement control and in an aligning fashion with respect to the respectively selected individual pins of the supporting plate, and capable of being moved towards the pins. In such types of devices the work of the operator is substantially facilitated, but the finished product must still be checked with respect to probable errors.

From another prior art arrangement relating to a semi-automatic wiring device, it is known to arrange on the rear side of the wiring frames, special carriers capable of being displaced with the aid of a positioning device, comprising an adapter plug capable of being displaced in the direction of the wiring frame. With the aid of this arrangement there is enabled a simultaneous automatic continuity check with respect to the established wire connection. Relative thereto, however, it is deemed a disadvantage that the operator has to guide the wiring tool manually, and to select the pins to be processed out of the entire wiring frame according to instructions.

SUMMARY OF THE INVENTION

It is the object of the present invention to provide a wiring system in which the wiring tool is guided mechanically (by machine) and in which the manufactured or resulting wiring is completely free from errors.

According to the invention, in consideration of an automatic wiring system for the wiring of a field of contact pins providing for a rearward access to the contact pins and a numerical movement control for both a wiring tool and a pair of test adapters on the rear side of the field of contact pins, this problem is solved in that one of the test adapters arranged on the rear side of the field of contact pins is rigidly connected to the holding arrangement of the wiring tool on the front side of the field of contact springs.

According to the invention it is proposed that the other test adapter, which is not connected to the holding arrangement of the wiring tool, comprises a test prod capable of being swivelled by 180°. The arrangement, however, can also be made in such a way that the test adapter which is not connected to the holding arrangement of the wiring tool comprises two test prods capable of being individually operated and staggered by 180°. Moreover, it is proposed that the test prod of the test adapter which is connected to the holding arrangement of the wiring tool, is placed onto the respective contact pin in front of the wiring tool.

By using the inventive wiring system it is possible, by involving a very low expenditure, to manufacture completely faultless wire-wrap connections in the course of one single step of operation.

BRIEF DESCRIPTION OF THE DRAWINGS

The invention will now be explained in detail with reference to an example of embodiment shown in the accompanying drawings, in which.

DESCRIPTION OF THE PREFERRED EMBODIMENT

Figure 1:
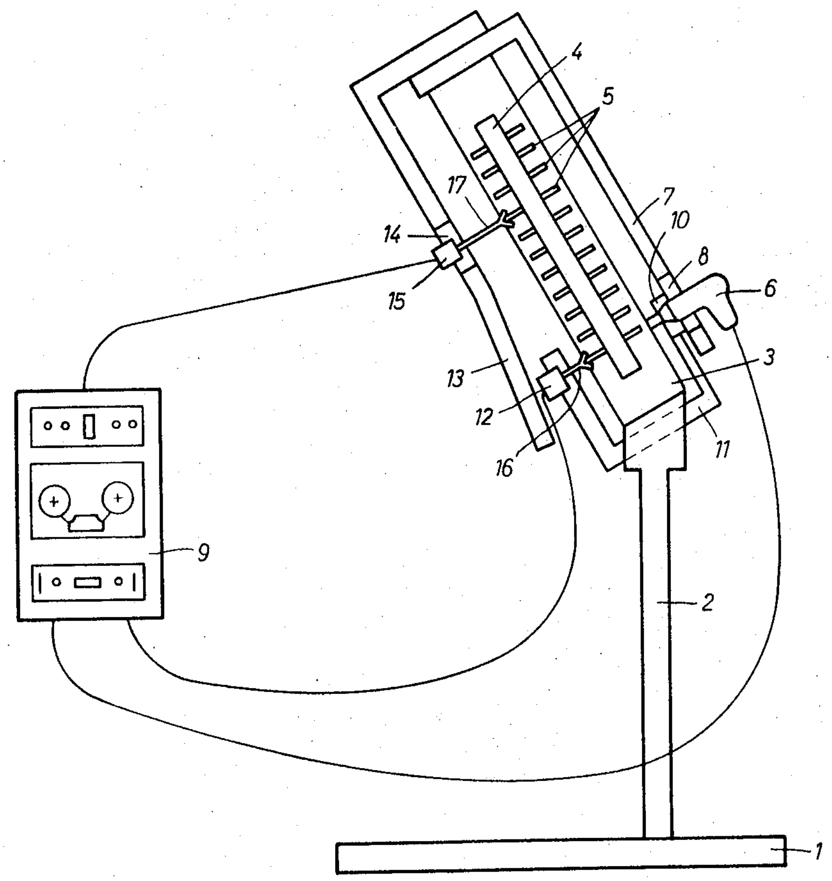
FIG. 1 schematically shows an automatic wiring (wire-wrapping) system in a side view.

FIG. 1 schematically shows an automatic wiring or wire-wrapping system in a side view. On a base plate 1 there is mounted a stand 2 carrying a frame 3. Into this frame 3, with the aid of means not shown, and in an easy interchangeable manner, there is inserted a field of contact pins or a contact pin assembly 4. For establishing the connection and effecting the wiring of a great number of building blocks, subassembly groups or plug-in units in electronic systems, there are used such conventional types of fields of contact pins (contact pin assemblies) 4. These fields of contact pins may include up to several thousand contact pins 5 arranged in rows and columns at an equal basic spaced relation, or a multiple thereof, with all of the contact pins having for example a rectangular cross-sectional shape which is particularly favorable for being engaged by a wiring tool 6. It is the only prerequisite of the contact pins that they be accessible from the rear side by test prods.

For a wiring tool 6 there may be preferably provided an automatically operating wire-wrapping gun capable of processing insulated switching wire from a supply reel. There may also be used any other tool, or a simple wire-wrap gun for serving as the wiring tool. This, however, would increase the amount of work to be done by the operator.

Parallel in relation to the front plane of the field of contact pins 4 there are arranged two arms 7 and 8 capable of being moved vertically in relation to one another and independently of one another in two coordinate directions, with these arms being joined to one another, for example, by means of a cross sleeve. To the one arm 8 there is mounted a holding arrangement 10 for the wiring tool 6, in which the latter is fixed in position. The arms 7 and 8 are moved by means of motors, with the latter being acted upon by the corresponding command signals produced in a control assembly shown as box 9. The motors and the control links running thereto from assembly 9 are not shown for clarity, inasmuch as this employs a typically conventional arrangement and such is deemed well within the ordinary skills of the artisan.

To the holding arrangement 10 for the wiring tool 6 there is mounted a substantially U-shaped arm 11, to the end of which, positioned on the rear side of the field of contact pins 4, there is attached a test adapter 12. This test adapter 12 is of conventional arrangement and comprises a test prod 16 which is capable of being moved vertically in relation to the plane of the field of contact pins 4. On account of this, the test adapter 12 will exactly follow the movements of the holding arrangement 10, and there is not required a separate motor for driving the test adapter.

Moreover, on the rear side of the field of contact pins 4, there are arranged two arms 13 and 14 capable of being moved vertically and independently of one another in two coordinate directions, with these arms being coupled to one another, for example, by means of a cross sleeve. To the one arm 14 there is mounted a test adapter 15 of similar design to test adapter 12. This test adapter 15 also comprises a test prod 17 capable of being moved vertically in relation to the plane of the field of contact pins 4. Both of the arms 13 and 14 are moved with the aid of motors receiving their corresponding command signals from the control box 9, in similar conventional manner to that regarding the movement of arms 7 and 8, also not shown for clarity.

The control box 9 contains conventional numerical movement controls for the motors of the arms 7, 8, 13 and 14, as well as a control arrangement for the wiring tool 6, and also control circuits for testing the manufactured or completed pulls of wire (wire lengths). The information for the entire sequence of operations may be taken, for example, from a perforated tape. It is also possible, however, to use any other information storage or recording medium. Via flexible cables, the control box 9 is connected to the wiring tool 6, the test adapters 12 and 15 and the motors for the arms 7, 8 and 13, 14. FIG. 1 only shows the cables needed for testing the manufactured pulls of wire, in a simple representation.

Figure 2B:
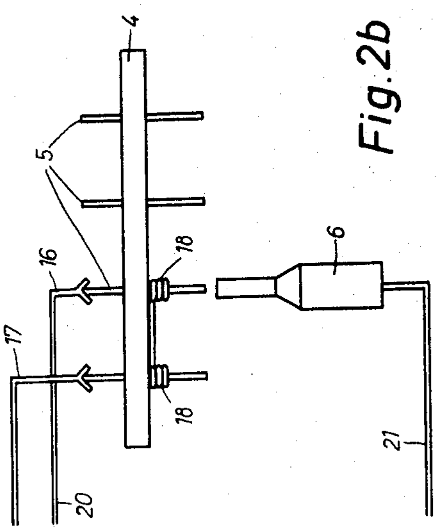
FIG. 2*b* is a top view showing diagramatically the position of the wiring tool and the test probes after application of wire to to a second contact pin.
Figure 2D:
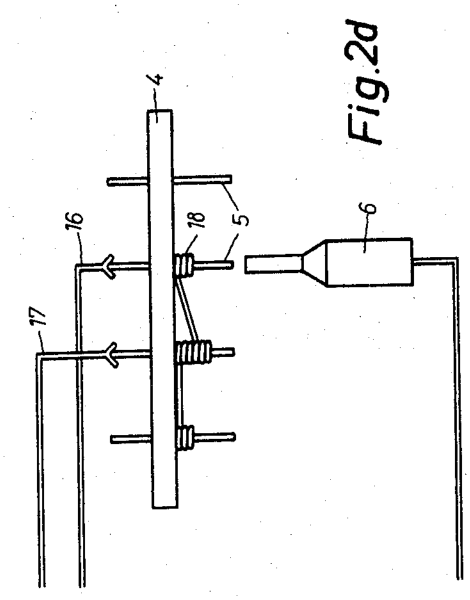
FIG. 2*d* is a top view showing diagramatically the position of the wiring tool and the test probes subsequent to application of wire to a third pin.
Figure 2A:
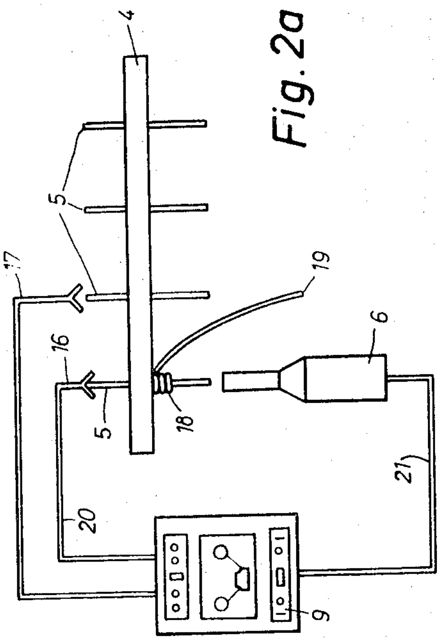
FIG. 2*a* is a top view showing diagramatically the position of the wiring tool and the test probes after application of wire to a first contact pin.

FIGS. 2*a* and 2*b* schematically show the sequence of operations of the automatic wiring system, in particular the testing process. The wiring tool 6, by the movement of the arms 7 and 8, is moved over the contact pin 5 which is to be worked on. The test prod 16 which is thus positioned on the rear side of the field of contact pins over the same contact pin 5, is lowered, and via the test prod 16 a test voltage is applied to this particular contact pin 5. Now the wiring tool 6 is likewise moved onto the contact pin 5 and the switching wire 19 taken, for example, from a supply reel, is connected to this contact pin 5 by means of the wire wrap 18.

Prior to establishing the wire-wrap connection 18 the wiring tool 6 detected as to whether the test voltage was available at the contact pin 5, thus determining that the proper contact pin has been approached. At the same time, the movement of the arms 7 and 8 may be subjected to one of the known nominal-to-actual value comparisons by way of the movement control in the control box 9. Testing of the contact pin is indicated by the lines 20 and 21 which are connected to the control box 9. The test prod 17 of the test adapter 15 is still in its rest position which is indicated by its retracted position shown in FIG. 2*a*.

Upon retraction of both the wiring tool 6 and the test prod 16, the switching wire 19 is applied either manually or likewise by the wiring tool 6 to the next contact pin 5 as indicated by the control, for being attached to this pin by means of a wire wrap as described hereinbefore. One pull of wire has now been laid out and may be checked (FIG. 2*b*). To this end, the wiring tool 6 is retracted from the contact pin 5. On the rear side of the field of contact pins 4, the test prod 16 remains in connection with the contact pin 5 at which the pull of wire terminates. Owing to the movement of the arms 13 and 14 caused by the movement control, the test adapter 15 is moved over the respective contact pin from which the pull of wire extends. Upon lowering the test prod 17 onto the contact pin there is completed the test circuit extending from the control box via the test prods and the laid-out pull of wire. The next pull of wire (wire length) can only be laid out after having been approved by the control-box circuit.

Figure 2C:
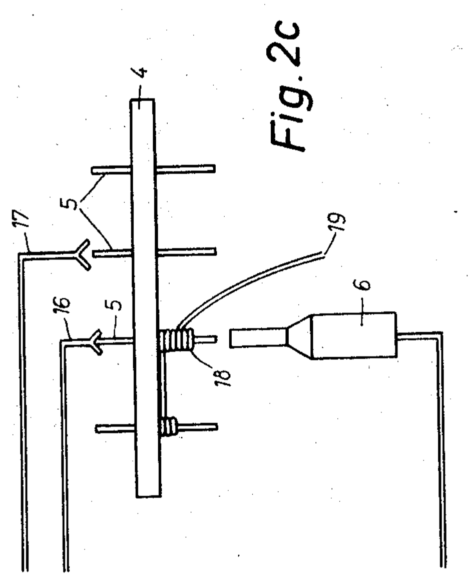
FIG. 2*c* is a top view showing diagramatically the position of the wiring tool and the test probes prior to application of wire to a third pin.

Assuming, for example, that the switching wire 19 is to be passed from the contact pin which was the last one to be processed, to a further contact pin. In this particular case, the test prod 16 can remain positioned on the contact pin 5, and only the test prod 17 is lifted off (FIG. 2*c*). After having established the wire-wrap connection 18, as already described hereinbefore, the switching wire 19 is passed onto the next contact pin 5 and is fixed in position by yet another wire wrap 18 (FIG. 2*d*), after the test prod 16 has applied the test voltage to this particular contact pin.

Now the test adapter 15 is again moved over the contact pin from which the pull of wire extends, and the test prod 17 is lowered onto this pin. In cases where the test provides an acceptance signal, the next pull of wire may be laid out. This next pull of wire can be laid out from any of the contact pins and not, as described hereinbefore by way of example, only from a contact pin onto which a wire has already been wrapped.

Figure 3A:
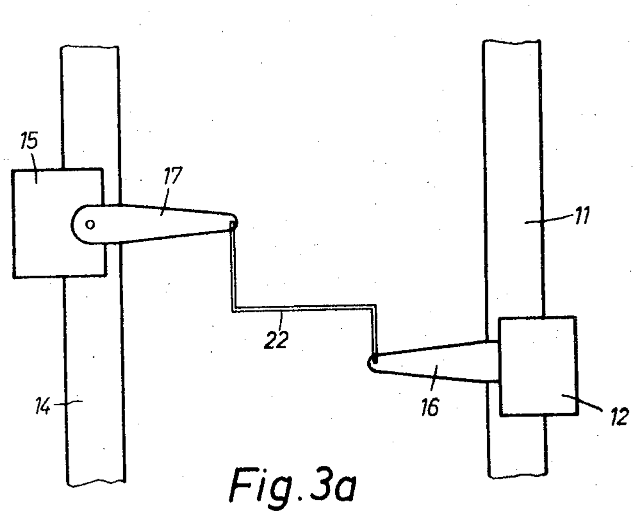
FIG. 3*a* is a diagramatic side view indicating one position of the test prod during the wire connection continuity test.
Figure 3B:
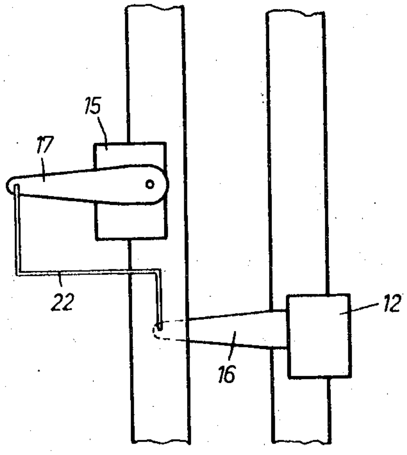
FIG. 3*b* is a diagramatic side view indicating a second position of the test prods during the wire connection continuity test.

FIGS. 3*a* and 3*b* show the mode of operation of the test adapter 15 especially when comprising a test prod 17 capable of being swivelled by 180°. In FIG. 3*a* the laid-out pull of wire is indicated by the reference numeral 22. The test prod 17 is positioned on the contact pin at the beginning of the pull of wire 22, and the test prod 16 is positioned on the contact pin at the end of the pull of wire 22. In the course of this, the test prod 17 is swivelled to the right out of the test adapter 15.

However, in order to reach the same contact pin, it is also possible to move the arm 14 towards the right, whereupon the test prod 17 as shown in FIG. 3*a* can then be swivelled by 180° towards the left as shown in FIG. 3*b*. This possibility is of advantage in cases where the next contact pin to be tested is apart from the preceding one by a distance corresponding to the spacing between the swivelled-out test prods. In such a case it can be done without moving the arm 14, and the test prod 17 only needs to be swivelled by 180°.

For keeping the movements of the arms 13 and 14 as small as possible, the test adapter 15 may also be provided with two test prods capable of being actuated independently of one another, instead of the one test prod 17 capable of being swivelled. These test prods might be arranged at the positions assumed by the test prod 17 which is capable of being swivelled by 180°, i.e. on the right and on the left of the arm 14.

Moreover, it is possible for the test adapter 12 not to be connected rigidly via an arm 11 to the holding arrangement 10 of the wiring tool 6, but to establish this connection via a (not shown) gearing. This would result in smaller dimensions of the construction.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In an automatic wiring system for wiring a field of contact pins arranged for rearward access thereto, and having numerical movement control for both a wiring tool and a pair of test first and second adapters, the latter being positioned on the rear side of the field of contact pins, the improvement comprising rigidly connecting said first test adapter to a holding arrangement for said wiring tool which is positioned on the front side of the field of contact pins thereby permitting simultaneous testing of said pins prior to wiring.

2. The automatic wiring system according to claim 1 wherein said second test adapter includes a test prod pivotably attached at one end to said second adapter, and fixedly attached at the other end to said first test adapter so as to be capable of being swivelled away from said first adapter when said pair of adapters are moved toward each other, and capable of being swivelled toward said first adapter when said pair of adapters are moved away from each other.

3. The automatic wiring system according to claim 1 wherein the test prod of said one test adapter is arranged to be placed onto the respective contact pin in front of the wiring tool.

4. The automatic wiring system according to claim 1 wherein said one test adapter is connected by means of a gearing on the rear side of said field of contact pins to the holding arrangement for the wiring tool as arranged on the front side.

* * * * *